(12) United States Patent
Frauchiger et al.

(10) Patent No.: US 8,852,439 B2
(45) Date of Patent: Oct. 7, 2014

(54) DRINKING STRAW WITH HOLLOW FIBRE LIQUID FILTER

(75) Inventors: Daniel Frauchiger, Prilly (CH); Roelie Bottema, LX Zuidhorn (NL); Mikkel Vestergaard Frandsen, Lausanne (CH)

(73) Assignee: LifeStraw SA, Lausanne (CH)

( * ) Notice: Subject to any disclaimer, the term of this patent is extended or adjusted under 35 U.S.C. 154(b) by 0 days.

(21) Appl. No.: 13/516,800

(22) PCT Filed: Dec. 18, 2009

(86) PCT No.: PCT/DK2009/050344
§ 371 (c)(1),
(2), (4) Date: Aug. 14, 2012

(87) PCT Pub. No.: WO2011/072677
PCT Pub. Date: Jun. 23, 2011

(65) Prior Publication Data
US 2012/0298583 A1 Nov. 29, 2012

(51) Int. Cl.
*B01D 61/00* (2006.01)
*B01D 63/00* (2006.01)
*A47G 19/22* (2006.01)
*C02F 1/44* (2006.01)
*A47G 21/18* (2006.01)
*B01D 65/02* (2006.01)
*B01D 63/02* (2006.01)
*C02F 1/00* (2006.01)
*C02F 1/68* (2006.01)
*C02F 1/50* (2006.01)

(52) U.S. Cl.
CPC .............. *C02F 1/444* (2013.01); *B01D 2321/04* (2013.01); *A47G 21/188* (2013.01); *B01D 65/02* (2013.01); *B01D 2313/12* (2013.01); *B01D 2311/04* (2013.01); *C02F 1/688* (2013.01); *C02F 1/50* (2013.01); *C02F 2303/24* (2013.01); *B01D 2313/24* (2013.01); *B01D 63/024* (2013.01); *C02F 1/002* (2013.01); *C02F 2303/16* (2013.01); *C02F 2303/04* (2013.01)
USPC ................... 210/650; 210/321.88; 210/257.2; 210/321.89; 210/469; 220/703; 220/705; 220/710; 220/717

(58) Field of Classification Search
CPC ....... C02F 1/002; C02F 1/444; B01D 63/024; B01D 2311/04; B01D 2321/04; B01D 63/02; B01D 61/16
USPC ......... 210/257.2, 262, 321.8, 321.88, 321.89, 210/469, 650, 198.1; 220/189.07; 239/33
See application file for complete search history.

(56) References Cited

U.S. PATENT DOCUMENTS

| | | |
|---|---|---|
| 4,435,289 A | 3/1984 | Breslau |
| 4,636,307 A | 1/1987 | Inoue |

(Continued)

FOREIGN PATENT DOCUMENTS

| | | |
|---|---|---|
| EP | 0938367 A1 | 9/1999 |
| EP | 1235502 B1 | 9/2004 |

(Continued)

*Primary Examiner* — Ana Fortuna
(74) *Attorney, Agent, or Firm* — James Creighton Wray

(57) ABSTRACT

A liquid filtration method and device, for example a drinking straw with a mouthpiece, and a bundle of hollow fibres. The open ends of the fibres are embedded in a base and provided in a compartment between the base and a liquid outlet. Water or other liquid flows into the inner volume of the hollow fibres and from there through their filtering membrane walls and into the compartment before the liquid flows out through the liquid outlet, for example the mouthpiece.

9 Claims, 1 Drawing Sheet

(56) References Cited

U.S. PATENT DOCUMENTS

| | | | |
|---|---|---|---|
| 4,940,542 A * | 7/1990 | Simizu et al. | 210/321.8 |
| 5,045,198 A * | 9/1991 | Norton | 210/321.87 |
| 5,160,673 A | 11/1992 | Wollbeck | |
| 5,518,613 A * | 5/1996 | Koczur et al. | 210/266 |
| 5,552,057 A * | 9/1996 | Hughes et al. | 210/668 |
| 5,718,681 A * | 2/1998 | Manning | 604/518 |
| 7,081,201 B2 | 7/2006 | Bassett | |
| 7,473,362 B1 * | 1/2009 | Nohren, Jr. | 210/321.64 |
| 8,318,011 B2 * | 11/2012 | O'Brien et al. | 210/200 |
| 8,334,003 B2 * | 12/2012 | Baron | 426/85 |
| 2003/0164333 A1 * | 9/2003 | Nohren et al. | 210/650 |
| 2003/0222010 A1 * | 12/2003 | Bassett et al. | 210/312 |
| 2004/0031744 A1 * | 2/2004 | Nakashima | 210/321.79 |
| 2004/0112826 A1 * | 6/2004 | Chiba et al. | 210/454 |
| 2005/0035041 A1 * | 2/2005 | Nohren et al. | 210/209 |
| 2005/0113746 A1 * | 5/2005 | Sedaghat Kerdar | 604/77 |
| 2006/0157398 A1 * | 7/2006 | Nohren | 210/266 |
| 2009/0078625 A1 | 3/2009 | Palumbo | |
| 2012/0228400 A1 * | 9/2012 | Baron | 239/33 |

FOREIGN PATENT DOCUMENTS

| | | | |
|---|---|---|---|
| JP | 63-287593 | * | 11/1988 |
| WO | 01/41607 A1 | | 6/2001 |
| WO | WO 01/41607 | * | 6/2001 |
| WO | 03/011769 A2 | | 2/2003 |
| WO | 2008/067817 A2 | | 6/2008 |
| WO | 2008/101159 A1 | | 8/2008 |
| WO | 2008/110172 A2 | | 9/2008 |
| WO | WO 2008/110166 | * | 9/2008 |

* cited by examiner

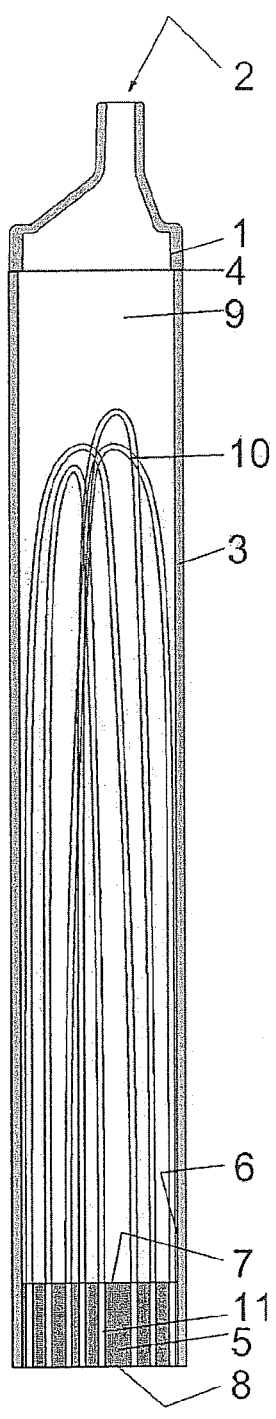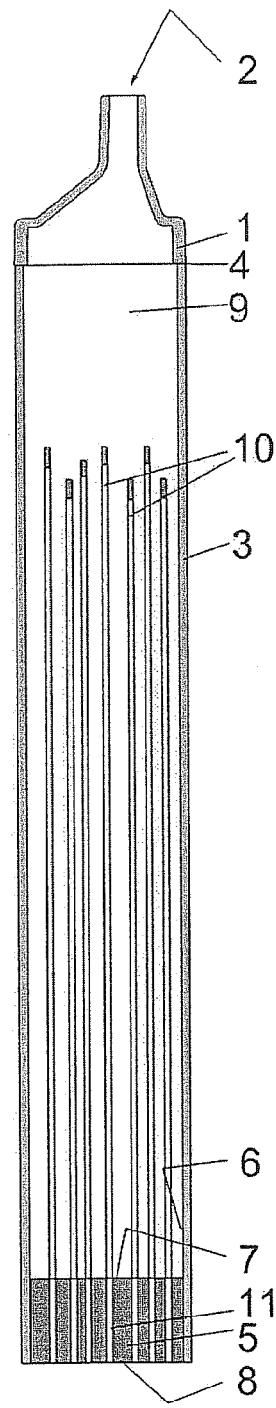
FIG. 1
FIG. 2

DRINKING STRAW WITH HOLLOW FIBRE LIQUID FILTER

This application claims the benefit of PCT/DK2009/050344 filed Dec. 18, 2009, International Publication Number WO 2011/0772677 A1, and the amended sheets, which are hereby incorporated by reference in their entirely as if fully set forth herein.

FIELD OF THE INVENTION

The present invention relates to a method for filtering liquids through a hollow fibre membrane filtration device with an inside-out flow. Especially it relates to water filtering through a filtration device operated by suction force from the mouth of a drinker. The invention also relates to a hollow fibre liquid filtration device with a mouthpiece.

BACKGROUND OF THE INVENTION

Hollow fibres are used in a large variety of water filtration devices, be it large municipal water plants or portable water filtration devices.

One possible hollow fibre configuration for water filters is disclosed in U.S. Pat. No. 4,435,289, where porous hollow fibres are supported and sealed by a hardened resin located at both ends of the fibres. Water flows into the inner volume of the fibres at the supported open ends and is filtered when flowing through the membrane wall of the hollow fibres. This flow is an inside-out flow, and filtrate will accumulate in the inner volume of the fibres. Such fibres are cleaning by forward flushing water through the inner volume of the fibres, possibly combined with a backflush as disclosed in International patent application WO 2008/101172 by Vestergaard Frandsen assigned to Vestergaard SA.

Another widespread configuration comprises a bent bundle of fibres with both ends of the bundle being supported in a head, from which the fibres extend downwards into a chamber, from which water is supplied for filtering. This principle is used in large or small water installations, for example as disclosed in U.S. Pat. Nos. 4,636,307, 5,160,673, or 7,081,201.

This principle is also disclosed in connection with personal drinking straws, such as in European patent No. EP2235502B1. This drinking straw has a mouthpiece for sucking water though the straw and a bundle of bent hollow, microporous fibres, which are supported with both ends in a head just below the mouthpiece. By suction action from the mouth of the user, the water flows from the outer side of the straw through the membrane walls of the hollow fibres and into the inner volume of the fibres. From the inner volume of the fibres, the filtered water is released in an upward direction through the open ends in the head and through the mouthpiece above the head.

The drinking straw as disclosed in European patent No. EP2235502B1 suffers from a general problem encountered with such filters as explained further in the following. The hollow fibres are hydrophilic in order to be able to transport water efficiently through the membranes. The hydrophilicity implies that air can not, or only hardly, traverse the membrane walls when these are wet. The consequence is a risk for air trapping in the volume around the fibres, which decreases the water flow, as the trapped air prevents an efficient water flow through the membranes.

This problem is well known and solutions to this problem have been proposed, for example by including a number of hydrophobic fibres, as disclosed in the above mentioned U.S. Pat. No. 4,636,307. However, this solution is production-wise more complicated and expensive.

It would be desirable to provide a simpler solution.

Instead of using bent fibres that extend into an upstream chamber, the fibres could have an open end supported in a head and a closed end extending into an upstream water chamber, for example as disclosed in European patent application EP0938367 and as also mentioned in European patent No. EP2235502B1. The principle is analogous to the one just described and encounters the same problem.

A slightly different configuration is disclosed in US patent application No. 2004/078625, where two bent, hollow fibre bundles are provided in a single housing with the bent parts facing each other. Water flows downwards through the upper, open, potted ends of the hollow fibres and through the bent membrane walls of the fibres. As a redundant measure, the second filter is traversed by an outside-in flow after which the water leaves the filter through the open ends of the second filter. This system suffers from the fact that air, which is transported through the first filter into the intermediate chamber between the two filters, may accumulate and prevent a proper liquid flow.

OBJECT OF THE INVENTION

It is the object of the invention to provide an improved hollow fibre liquid filter, for example water filter. Especially, it is the purpose to provide a drinking straw with a hollow fibre liquid filter with simple means to avoid air trapping in the filter.

DESCRIPTION OF THE INVENTION

This purpose is achieved with a filtration device and a method for filtering liquid according to the following.

A filtration device is provided, which comprises a liquid inlet and a liquid outlet and a conduit connected to the liquid outlet for transport of liquid to the liquid outlet. The conduit contains only a single bundle of hollow fibres. The support member is sealingly connected to the conduit, thereby defining a compartment between the support member and the liquid outlet. Each hollow fibre has a microporous membrane surrounding an inner chamber for filtering microparticles from the liquid when the liquid flows through the membranes. Each of the fibres either has one open end supported in the support member and one closed end in a strand extending away from the support member, or each of the fibres has both ends supported in the support member and has a looped part extending away from the support member. The closed ends or the looped parts extend from the support member into the compartment towards the liquid outlet.

A flow of the liquid is provided into the liquid inlet, through the open ends of the fibres into the inner chambers of the fibres, from the inner chambers through the membranes into the compartment and from the compartment out of the conduit through the liquid outlet.

In contrast to the above mentioned US patent application No. 2004/078625, the device contains only a single bundle of hollow fibres, such that air trapping in an intermediate chamber is avoided, also when no valves for air escape are employed or no hydrophobic fibres are inserted, such that the system only has fibres with hydrophilic membranes.

As the flow is reversed relatively to the European patent No. EP2235502B1, the risk for air trapping is drastically reduced, because the sum of the volume of the chambers inside the hollow fibres is much smaller than the volume in the compartment around the fibres.

The invention is especially useful, if the filtrations device is oriented with the liquid inlet downwards. In this case, air trapping may only occur in the inner chambers of the hollow fibres, which corresponds to a very little volume, from which air can relatively easily escape through the hydrophilic membranes, which, in practice, allow minute amounts of air to flow through despite their hydrophilicity.

Advantageously, the liquid outlet is provided with a mouthpiece being shaped for positioning in the mouth of a drinker of the liquid. By suction force at the mouthpiece with a mouth of a drinker, liquid can be sucked through the filtration device.

Having a mouthpiece, the filtration device constitutes a drinking straw. When oriented with the mouthpiece upwards and the support member downwards relatively to the mouthpiece such that the fibres extend upwards from the support member, the support member functions as a base. The liquid is flowing upwards from the liquid inlet, through the open ends of the fibres into the inner chambers of the fibres, from the inner chambers through the membranes into the compartment and from the compartment through the mouthpiece into the mouth of a drinker.

The difference of this drinking straw relatively to the prior art straw as disclosed in European patent No. EP2235502B1 is a relative upside-down arrangement of the fibres in the conduit such that these get an inside-out flow in contrast to the outside-in flow in the system of EP2235502. Especially, the closed ends or the looped parts extend from the support member towards the mouthpiece into the compartment. By this simple change, it has been discovered in experiments that air trapping in the system is no problem any longer, independently whether the fibres are dry or wet, empty, or partially or fully filled with water.

This change of flow relatively to European patent No. EP2235502B1 also makes efficient backwashing of the hollow fibres with filtered water possible by mouth-blowing the filtered water remaining in the compartment back through the membranes, thus increasing the filtering lifetime of the product. The circumvented configuration relatively to the prior art provides a compartment with backflushable water having a volume which is large compared to the summed volumes of inner chambers of the fibres, thus, there is relatively much water that can be used for backflush.

There is a great demand for proper functioning portable drinking straws, because many people in rural areas are solely dependent on such personal drinking straws for the supply of filtered water. The drinking straw can be made compact and measure with its mouthpiece only between 15 and 30 cm in length and between 2 and 4 cm in width.

Typically, the support member will be produced by standard potting methods, such that the support member comprises a resin into which the open ends of the fibres are embedded.

In order to prevent larger particles to enter the fibres, the drinking straw may comprise a liquid inlet with a number of pre-filters on the upstream side of the support member, which is opposite to the downstream side from which the fibres extend in to the compartment. Optionally, such a pre-filter is a mesh or a textile filter or a combination. For example, the mesh size and pore size of the pre-filter may be chosen to 5 microns for filtering particles larger than that size.

Although primarily, the drinking straw is provided for purifying water by filtering out particles and microbes, it could be used for other liquids as well especially polar liquids.

The device according to the invention may also be provided with an antimicrobial for counteracting microbes, including bacteria and virus, for example in the compartment. The antimicrobial may contain a biostatic and/or biocide in order to prevent proliferation of microbes or even kill or otherwise deactivate or destroy microbes, for example in the compartment. Especially, when a mouth-blowing backflush is performed, microbes may be introduced backwards through the liquid outlet into the compartment, where these microbes may proliferate and become a health risk. Typically, it suffices to provide an antimicrobial agent only in the compartment between the support member and the liquid outlet, although it may also, optionally, be provided in the upstream part on the second side of the support member towards the liquid inlet.

A variety of different options for antimicrobials are disclosed in International patent application WO 2008/067817 by Vestergaard-Frandsen assigned to Vestergaard SA. Following some special principles of WO 2008/067817, the antimicrobial source may be incorporated into the inner wall of the conduit or provided on the inner wall of the conduit or may be a separate source provided in the compartment. Also the mouthpiece may be antimicrobial. Optionally, the membranes may be provided with an antimicrobial, as well.

Advantageously, the filtration device is equipped with a nutrition source for providing nutritional trace elements for the drinker, for example vitamins and minerals including salts and metal-based minerals.

Water filtration devices with nutrition sources incorporated are known, for example as disclosed in International application WO03/011769. In connection with filtration devices comprising nutrition sources, the following method is useful on a general basis and not only limited to the filtration devices and methods as described above.

It comprises the identification of potential users of a number of filtration devices, and dividing the potential users into different groups with different, group-specific group-characteristics. In addition, different compositions of nutritional trace elements are selected in dependence of the group-characteristics. For example, one group may be pregnant women having a need of iron supplements, whereas another group may comprise teenagers with a primary need of special vitamins. A grouping may also be based on geographical criteria, for example the people in one village in a rural area having a primary need of a first group of specific nutrients, whereas another village needs another composition of nutrients.

For a plurality of such groups, different group-specific, slowly dissolvable nutrition sources with different, group-specific nutritional compositions types are provided in the filtration devices. The different filtration devices may be identical apart from the type of nutrition source, which is group-specific.

If the group is a family or larger group using the same water filtration device, the method can be successfully applied for a family water filtration device or a filtration device of a larger scale.

Having regard to the fact that drinking straws, typically, are used by a single person, the principle may be applied even on an individual scale. Thus, an analysis may be performed of individuals, and a drinking straw personalized with respect to the release of nutrition from an individualized nutrition source drinking straw.

This method can be applied to any filtration device being equipped with a nutrient source, including filtration devices according to the prior art, and, specifically, it may be applied for a method and device as described above.

SHORT DESCRIPTION OF THE DRAWING

The invention will be described in more detail in the following with reference to the drawing, where FIG. 1 is a sketch of a drinking straw with bent fibres,
FIG. 2 is a sketch of a drinking straw with straight fibres closed at one end.

DETAILED DESCRIPTION OF THE INVENTION

The drawing in FIG. 1 and FIG. 2 illustrate a filtration device according to the invention, however, provided in the form of a drinking straw for the drinking of liquid, typically water. FIG. 1 is a sketch of a drinking straw with bent fibres, and FIG. 2 is a sketch of a drinking straw with straight fibres closed at one end.

The drinking straw comprises a mouthpiece 1 having an outlet 2 that is shaped for positioning in the mouth of a drinker of the liquid. A hollow conduit 3 has a sealing connection 4 to the mouthpiece 1 or is integrally formed with it. Inside the conduit 3, there is provided a support member 5. The support member 5 extends across the conduit 3 and seals against the inner walls 6 of the conduit 3.

The support member 5 has a first side 7 and a second, opposite side 8. A compartment 9 is formed and delimited by the mouthpiece 1, the conduit 3, and the support member 5.

A plurality of hollow fibres 10 have their ends 11 embedded in the support member 5, thereby forming a looped part, as illustrated in FIG. 1, extending away from the first side 7 of the support member 5 and into the compartment 9 towards the mouthpiece 1.

In alternative configuration, as illustrated in FIG. 2, the fibres are straight and each has a closed end extending away from the first side.

The support member 5 is, typically, produced by a potting method, where the ends 11 of the fibres 10 are embedded in a fluid resin which then hardens to form a solid support member 5.

One or more, in this case two, holders 12, 13 are fastened to the conduit 3. The holders 12, 13 comprise pre-filters, for example a coarse mesh filter 15 upstream of a textile filter 14 in order to prevent large particles to enter the water inlet 16 and the hollow fibres 10.

The illustration shows the drinking straw in an orientation ready for use, where the lower end 12 of the straw is placed in a liquid, typically water, and suction force is applied to the mouthpiece by the mouth of a drinker.

The functioning is explained in further detail in the following. When the straw is placed in water for the first time and suction force is applied to the mouthpiece, the lower part with the filters 14, 15 and the inner chambers of the fibres 10 will be filled with air. As the fibres are dry, the air can escape through the membrane wall, and water will flow into the inner chambers of the membranes. Larger particles are prevented from entering the water inlet 16 due to the mesh filter 15. Smaller particles are caught by the textile filter 14 such that only microbes and micro-particles enter through the water inlet and the open ends 11 of the fibres 10 into the inner chambers of the fibres 10. The water is filtered in an inside-out motion through the membranes, such that microbes reside in the inner chamber of the fibres 10, and the cleaned water flows into the compartment 9 outside the fibres 10. From the compartment, the clean water is sucked further through outlet 2 in the mouthpiece 1.

When the drinking straw is not in use, the water from the water inlet 16 will run out of the straw in a downward direction. The user may also by blowing press remaining clean water from the compartment 9 backwards through the filter, and thereby backflush the system with filtered water for cleaning.

Some water will remain in the fibres due to capillary action making the straw ready for next use, unless the storage time of the straw is so long that the water in the inner chambers dries out. If the membranes are dry, the start procedure with the air escaping through the membranes is the same as described above for the first-time-use.

Even in the case, where the membranes are still wet and with air in the inner chambers, the relatively small amount of air trapped in the inner chambers of the fibres can relatively easy escape through the membranes, as the hydrophilicity does not stop air transport completely.

The configuration of the system dramatically reduces the amount of trapped air, such that an escape thereof happens quickly when the drinking straw is in use, independently of the membranes being wet or not, which adds to the versatility of the system relatively to prior art drinking straws.

Although the functioning has been described with respect to water, it is analogous for other liquids, especially polar liquids.

The invention claimed is:

1. A method for filtering liquid, the method comprises providing a filtration device with a liquid inlet and a liquid outlet and a conduit sealingly connected to the liquid outlet for transport of liquid to the liquid outlet; the conduit containing a bundle of hollow fibres; wherein a support member is sealingly connected to the conduit, thereby defining a compartment between the support member and the liquid outlet; wherein each hollow fibre has a microporous membrane surrounding an inner chamber for filtering microparticles from the liquid when the liquid flows through the membranes; each of the fibres either having one open end supported in the support member and one closed end in a strand extending away from the support member, or each of the fibres having both ends supported in the support member and having a looped part extending away from the support member; wherein the device contains only a single bundle of hollow fibres; the method comprising providing a flow of the liquid through the liquid inlet and through the open ends of the fibres into the inner chambers of the fibres, from the inner chambers through the membranes into the compartment and from the compartment out of the conduit through the liquid outlet, wherein the closed ends or the looped parts extend from the support member into the compartment towards the liquid outlet, wherein the method comprises orienting the filtration device with the liquid inlet downwards, providing the liquid outlet with a mouthpiece and providing a suction force at the mouthpiece with a mouth of a drinker for sucking liquid through the filtration device, and orienting the filtration device with the mouthpiece upwards and the support member downwards relatively to the mouthpiece such that the fibres extend upwards from the support member, wherein the liquid is water and the microparticles comprise microbes said process reduces air trapping in the filtration device and increases membrane water flow.

2. The method according to claim 1, wherein the method comprises pressing liquid by a mouth-blowing action back into the filtration device for backflushing the hollow fibres.

3. A method for filtering liquid and addition of nutrients, the method comprises providing a filtration device with a liquid inlet and a liquid outlet and a conduit sealingly connected to the liquid outlet for transport of liquid to the liquid outlet; the conduit containing a bundle of hollow fibres; wherein a support member is sealingly connected to the conduit, thereby defining a compartment between the support member and the liquid outlet; wherein each hollow fibre has a microporous membrane surrounding an inner chamber for filtering microparticles from the liquid when the liquid flows through the membranes; each of the fibres either having one open end supported in the support member and one closed end in a strand extending away from the support member, or each of the fibres having both ends supported in the support member and having a looped part extending away from the support member; wherein the device contains only a single bundle of hollow fibres; the method comprising providing a flow of the liquid through the liquid inlet and through the open ends of the fibres into the inner chambers of the fibres, from the inner chambers through the membranes into the compartment and from the compartment out of the conduit through the liquid outlet, wherein the closed ends or the looped parts extend from the support member into the compartment towards the liquid outlet, wherein the liquid is water and the microparticles comprise microbes, wherein a nutritional source is provided within the compartment, wherein the method comprises identifying potential users of a number of filtration devices, dividing the potential users into different groups with different group-specific group-characteristics, selecting different compositions of nutritional trace elements in dependence of the group-characteristics, and providing for a plurality of groups different group-specific types of filtration devices with slowly dissolvable nutrition sources containing different, group-specific nutritional compositions.

4. The method according to claim 3, wherein at least some of the groups only contain one group member, and the method comprises providing a personalized filtration device with an individualized nutrition source.

5. A liquid filtration device, wherein the device comprises a liquid inlet and a liquid outlet and a conduit sealingly connected to the liquid outlet for transport of liquid to the liquid outlet; the conduit containing only a single bundle of hollow fibres; wherein a support member is sealingly connected to the conduit, thereby defining a compartment between the support member and the liquid outlet; wherein each hollow fibre has a microporous membrane surrounding an inner chamber for filtering microparticles from the liquid when the liquid flows from the inner chamber through the membranes; the fibres having both ends supported in the support member and having a looped part extending away from the support member, said device being capable of reducing air trapping in the filtration device in operation; the liquid filtration device having a mouthpiece at the liquid outlet, the mouthpiece being shaped for positioning in the mouth of a drinker of the liquid, wherein the looped parts extend from the support member into the compartment towards the mouthpiece, wherein the liquid inlet is provided with a number of pre-filters on the upstream side of the support member, which is opposite to the downstream side and from which the fibres extend into the compartment, wherein the pre-filter is a mesh or a textile filter or a combination thereof, wherein the device is a drinking straw configured for transport of water through the device by an inside-out flow by suction force at the mouthpiece with a mouth of a drinker.

6. The filtration device according to claim 5, wherein the device only has fibres with hydrophilic membranes.

7. A liquid filtration device, wherein the device comprises a liquid inlet and a liquid outlet and a conduit sealingly connected to the liquid outlet for transport of liquid to the liquid outlet; the conduit containing only a single bundle of hollow fibres; wherein a support member is sealingly connected to the conduit, thereby defining a compartment between the support member and the liquid outlet; wherein each hollow fibre has a microporous membrane surrounding an inner chamber for filtering microparticles from the liquid when the liquid flows from the inner chamber through the membranes; the fibres either having one open end supported in the support member and one closed end in a strand extending away from the support member, or the fibres having both ends supported in the support member and having a looped part extending away from the support member; the liquid filtration device having a mouthpiece at the liquid outlet, the mouthpiece being shaped for positioning in the mouth of a drinker of the liquid, wherein the closed ends or the looped parts extend from the support member into the compartment towards the mouthpiece, wherein the liquid inlet is provided with a number of pre-filters on the upstream side of the support member, which is opposite to the downstream side and from which the fibres extend into the compartment, wherein the pre-filter is a mesh or a textile or a combination thereof, wherein the device only has fibres with hydrophilic membranes, wherein the compartment is provided with a biostatic for preventing proliferation of microbes, including bacteria and virus, in the compartment, and wherein the device is a drinking straw configured for transport of water through the device by an inside-out flow by suction force at the mouthpiece with a mouth of a drinker and to reduce air trapping in the filtration device increasing membrane water flow.

8. A liquid filtration device, wherein the device comprises a liquid inlet and a liquid outlet and a conduit sealingly connected to the liquid outlet for transport of liquid to the liquid outlet; the conduit containing only a single bundle of hollow fibres; wherein a support member is sealingly connected to the conduit, thereby defining a compartment between the support member and the liquid outlet; wherein each hollow fibre has a microporous membrane surrounding an inner chamber for filtering microparticles from the liquid when the liquid flows from the inner chamber through the membranes; the fibres either having one open end supported in the support member and one closed end in a strand extending away from the support member, or the fibres having both ends supported in the support member and having a looped part extending away from the support member; the liquid filtration device having a mouthpiece at the liquid outlet, the mouthpiece being shaped for positioning in the mouth of a drinker of the liquid, wherein the closed ends or the looped parts extend from the support member into the compartment towards the mouthpiece, wherein the liquid inlet is provided with a number of pre-filters on the upstream side of the support member, which is opposite to the downstream side and from which the fibres extend into the compartment, wherein the pre-filter is a mesh or a textile or a combination thereof, wherein the compartment is provided with a biocide for killing or deactivating microbes, including bacteria and virus, in the compartment, and wherein the device is a drinking straw configured for transport of water through the device by an inside-out flow by suction force at the mouthpiece with a mouth of a drinker and to reduce air trapping in the filtration device increasing membrane water flow.

9. A liquid filtration device, wherein the device comprises a liquid inlet and a liquid outlet and a conduit sealingly connected to the liquid outlet for transport of liquid to the liquid outlet; the conduit containing only a single bundle of hollow fibres; wherein a support member is sealingly connected to the conduit, thereby defining a compartment between the support member and the liquid outlet; wherein each hollow fibre has a microporous membrane surrounding an inner chamber for filtering microparticles from the liquid when the liquid flows through the membranes; the fibres either having one open end supported in the support member and one closed end in a strand extending away from the support member, or the fibres having both ends supported in the support member and having a looped part extending away from the support member; the liquid filtration device having a mouthpiece at the liquid outlet, the mouthpiece being shaped for positioning in the mouth of a drinker of the liquid, wherein the closed ends or the looped parts extend from the support member into the compartment towards the mouthpiece, wherein the liquid inlet is provided with a number of pre-filters on the upstream side of the support member, which is opposite to the downstream side and from which the fibres extend into the compartment, wherein the device only has fibres with hydrophilic membranes, wherein the filtration device also comprises a nutrition source for human beings.

* * * * *

UNITED STATES PATENT AND TRADEMARK OFFICE
CERTIFICATE OF CORRECTION

PATENT NO.        : 8,852,439 B2                                    Page 1 of 1
APPLICATION NO.   : 13/516800
DATED             : October 7, 2014
INVENTOR(S)       : Daniel Frauchiger et al.

It is certified that error appears in the above-identified patent and that said Letters Patent is hereby corrected as shown below:

In the Specification:

Column 1, line 6, change "WO 2011/0772677 A1" to --WO 2011/072677 A1--.

Signed and Sealed this
Thirteenth Day of January, 2015

Michelle K. Lee
*Deputy Director of the United States Patent and Trademark Office*